(12) United States Patent
Fehn et al.

(10) Patent No.: US 7,273,911 B2
(45) Date of Patent: Sep. 25, 2007

(54) SELF-ADHESIVE ADDITION-CROSSLINKING SILICONE COMPOSITIONS

(75) Inventors: Armin Fehn, Mehring (DE); Philipp Mueller, Burghausen (DE)

(73) Assignee: Wacker Chemie AG, Munich (DE)

( * ) Notice: Subject to any disclaimer, the term of this patent is extended or adjusted under 35 U.S.C. 154(b) by 407 days.

(21) Appl. No.: 10/895,867

(22) Filed: Jul. 21, 2004

(65) Prior Publication Data
US 2005/0042462 A1    Feb. 24, 2005

(30) Foreign Application Priority Data
Aug. 21, 2003  (DE)  ................. 103 38 478

(51) Int. Cl.
*C08L 83/04*    (2006.01)
(52) U.S. Cl. .................. 525/478; 525/477; 528/15; 528/25; 528/31; 528/32
(58) Field of Classification Search .................. None
See application file for complete search history.

(56) References Cited

U.S. PATENT DOCUMENTS

| | | | |
|---|---|---|---|
| 3,510,001 A | 5/1970 | Baer et al. | |
| 4,011,247 A | 3/1977 | Sato et al. | |
| 4,203,913 A | 5/1980 | Burkhardt et al. | |
| 4,257,936 A | 3/1981 | Matsumoto et al. | |
| 5,312,855 A | 5/1994 | Okami | |
| 5,438,094 A | 8/1995 | Fujiki et al. | |
| 2001/0011117 A1 | 8/2001 | Pesch et al. | |
| 2001/0049414 A1 | 12/2001 | Muller et al. | |
| 2002/0187358 A1 | 12/2002 | Reidmeier et al. | |
| 2003/0049465 A1* | 3/2003 | Kerboua et al. | ............ 428/447 |
| 2003/0236380 A1 | 12/2003 | Fehn et al. | |

FOREIGN PATENT DOCUMENTS

| | | |
|---|---|---|
| DE | 102 26 626 A1 | 1/2004 |
| EP | 0 686 671 | 12/1995 |
| EP | 0 875 536 | 11/1998 |
| EP | 1 148 098 | 5/2003 |
| EP | 1 266 948 | 7/2004 |

OTHER PUBLICATIONS

T.N. Sorrell and H. Yuan, J. Org. Chem. 62, (1997) pp. 1899-1902.

* cited by examiner

*Primary Examiner*—Marc S. Zimmer
(74) *Attorney, Agent, or Firm*—Brooks Kushman PC

(57) ABSTRACT

Self-adhesive addition-crosslinking silicone compositions, contain two adhesion promoters, a first, multinuclear aromatic compound containing at least one moiety of aliphatic unsaturation, and a low viscosity organopolysiloxane having at least one terminal, silicon-bonded hydrogen. The addition curable materials exhibit strong adhesion to substrates, even substrates which have exhibited problematic adhesion to silicone elastomers in the past.

19 Claims, No Drawings

SELF-ADHESIVE ADDITION-CROSSLINKING SILICONE COMPOSITIONS

BACKGROUND OF THE INVENTION

1. Field of the Invention

The invention relates to self-adhesive addition-crosslinking silicone compositions, to addition-crosslinked silicone elastomers, and to processes for preparing them.

2. Background Art

It is known that the adhesion of addition-crosslinked silicone elastomers to numerous substrates such as plastics, metals or glasses, is low. If, for example, an addition-crosslinking silicone elastomer compound is applied to a substrate and subsequently crosslinked, the resultant silicone elastomer is generally removable from the substrate surface without problems, i.e., by application of low tensile forces. Indeed, in many cases, spontaneous detachment of the silicone elastomer from the substrate is observed. Since in numerous applications, however, a firm and lasting substrate adhesion of the silicone elastomer is of critical importance, a multiplicity of special measures have been proposed in order to obtain a firm bond between substrate and silicone elastomer.

In principle the adhesion of the assembly formed between silicone elastomer and substrate can be increased by altering the chemical and/or physical nature of the substrate or of the substrate surface in an appropriate way before the addition-crosslinking silicone elastomer composition is applied. This can be done, for example, by pretreating the substrate surface with adhesion promoter additives, commonly known as primers; plasma-treating the substrate surface; mixing special additives into the substrate; and/or purposively modifying the morphology of the substrate or increasing the surface roughness. Disadvantages of such measures include the need for additional process steps or for specific requirements to be imposed on the nature of the substrate.

The adhesion of the assembly formed between silicone elastomer and substrate can additionally be increased by purposively modifying the chemical and/or physical nature of the addition-crosslinking silicone elastomer compound. Numerous adhesion-promoting additives are known which, when admixed to the uncrosslinked silicone compound, are intended to allow self-adhesion of the resultant silicone elastomer to a variety of substrates. For example, European laid-open specification EP 0 875 536 A2 describes epoxy-functional alkoxysilane and/or alkoxysiloxane adhesion promoters. In U.S. Pat. No. 4,257,936, adducts of acryloyltri-alkoxysilanes with cyclic hydropolysiloxanes act as adhesion promoters. U.S. Pat. No. 4,011,247 discloses epoxy adducts of hydropolysiloxanes, while U.S. Pat. No. 3,510,001 discloses alkoxysilane adducts of triallyl isocyanurate. U.S. Pat. No. 5,312,855 describes siloxane compounds having SiH and alkoxysilyl or glycidyl groups in combination with an organic compound having 2 or more allyl ester groups as adhesion promoters.

U.S. Pat. No. 5,438,094 discloses self-adhesive addition-crosslinking silicone compositions which comprise special organohydropolysiloxanes as crosslinkers and compounds having at least one aliphatic unsaturated group and two phenylene skeletons per molecule as adhesion promoters. The organohydrosiloxanes claimed are of the general formula (1), (2) or (3): $R_3Si(O\text{—}SiHR)_nOSiR_3$ (1), $(OSiHR)_n$ cyclics (2), and $R_{4-1}Si(OSiHR_2)_1$ (3). In the formulae (1), (2), and (3) the radicals R are substituted or unsubstituted monovalent hydrocarbon groups, 1 is 3 or 4, and n is an integer which is at least 3. Described as not inventive in patent U.S. Pat. No. 5,438,094, in contrast, is an organopolysiloxane component with the general formula (4): $Me_3Si\text{—}(SiHMe)_5\text{—}(OSiMe_2)_8\text{—}SiMe_3$ (4).

The prior art self-adhesive addition-crosslinking silicone rubber compounds using the stated adhesion additives have in some cases improved adhesion to metals and some organic resins and plastics. A disadvantage, however, is that these self-adhesive addition-crosslinking silicone rubbers do not exhibit improved adhesion with respect, in particular, to problem plastics such as nylon resins, polycarbonate resins, and acrylic resins, for example.

SUMMARY OF THE INVENTION

It is an object of the invention to overcome the disadvantages of the prior art and to improve in particular the adhesion to various plastics such as nylon resins, polycarbonate resins, and acrylic resins, for example, and also to metals. It has surprisingly been found that with the silicone composition of the invention a self-adhesive silicone rubber compound is obtained which adheres well not only to various metals but also to a variety organic plastics. In particular the adhesion to plastics generally regarded as problem plastics, such as nylon resins, polycarbonate resins, and acrylic resins, for example, is very good. The invention accordingly provides addition-crosslinking silicone compositions comprising at least one organopolysiloxane, at least one organohydropolysiloxane, and at least one hydrosilylation catalyst, further comprising at least two adhesion promoters, one being an aliphatically unsaturated group-containing binuclear aryl compound, and one being a low viscosity organohydropolysiloxane.

DETAILED DESCRIPTION OF THE PREFERRED EMBODIMENT(S)

In the present invention, preference is given to addition-crosslinking silicone compositions comprising:

(A) organopolysiloxanes comprising units of the general formula (I)

$$R^1_a R^2_b SiO_{(4-a-b)/2} \qquad (I),$$

where $R^1$ is hydroxyl radical or a monovalent, unsubstituted or halogen-substituted hydrocarbon radical having 1 to 20 carbon atoms which is free from aliphatically unsaturated groups and in which individual carbon atoms may have been replaced by O, N, S or P atoms, $R^2$ is a monovalent, aliphatically unsaturated, unsubstituted or halogen-substituted hydrocarbon radical having 1 to 10 carbon atoms in which individual carbon atoms may have been replaced by O, N, S or P atoms, a is 0, 1, 2 or 3, and b is 0, 1, 2 or 3, with the proviso that the sum (a+b) is ≦3, that per molecule there are on average at least two aliphatically unsaturated radicals $R^2$ and that the viscosity of the organopolysiloxanes (A) determined at 25° C. is from 0.001 to 40,000 Pas, (B) organohydropolysiloxanes comprising units of the general formula (II)

$$R^3_c R^4_d R^5_{e/2} H_f SiO_{(4-c-d-e-f)/2} \qquad (II),$$

where $R^3$ is a monovalent aliphatically saturated hydrocarbon radical having 1 to 20 carbon atoms, $R^4$ is (a) a monovalent, unsubstituted or halogen-substituted hydrocarbon radical having 6 to 15 carbon atoms which comprises at least one aromatic $C_6$ ring, or (b) a monovalent, unsubstituted or halogen-substituted, saturated hydrocarbon radical having 2 to 20 carbon atoms, in which individual carbon atoms may have been replaced by O, N, S or P atoms, $R^5$ is a divalent, unsubstituted or halogen-substituted hydrocarbon radical having 6 to 20 carbon atoms, in which individual carbon atoms may have been replaced by O, N, S or P atoms, which is Si-bonded on both sides, c is 0, 1, 2 or 3, d is 0, 1, 2 or 3, e is 0, 1, 2 or 3, and f is 0, 1, 2 or 3, with the proviso that the sum (c+d+2e+f) is ≦3, that the organohydropolysiloxane (B) contains on average per molecule at least 3 SiH groups, and that the viscosity of the organohydropolysiloxane (B) determined at 25° C. is from 0.0005 to 100 Pas, (C) at least one adhesion promoter of the general formula (III):

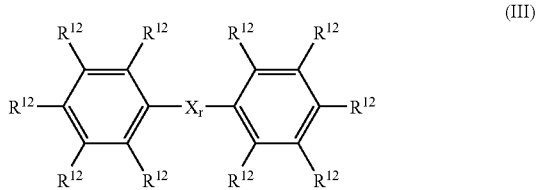

where $R^{12}$ is a hydrogen atom, a hydroxyl group, a halogen atom, an alkyl, alkenyl, alkoxy, alkenyloxy or aryl group or a monovalent organic group which contains an alkenyl, alkoxy, glycidyl, carbonyl, carbonyloxy, silyloxy or alkoxysilyl group, at least one of the radicals $R^{12}$ being an alkenyl group or a monovalent organic group containing an alkenyl group, and X is —($R^{13}$—)C(—$R^{13}$)—, —(O=)S(=O)—, —(O=)S—, —C(=O)—, —O—($CH_3$—) Si(—$CH_3$)—O—, —($CH_2$)$_5$— or —O— in which $R^{13}$ is a hydrogen atom, a halogen atom or a substituted or unsubstituted alkyl, aryl, alkenyl or alkynyl group, s is a positive number which is at least 2, and r is 0 or 1, (D) at least one adhesion promoter of the following general formula (IV)

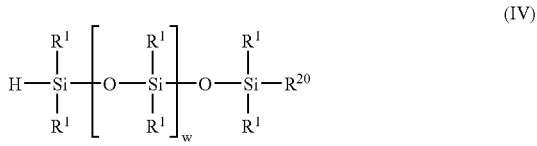

in which $R^1$ is as defined above, $R^{20}$ is a hydroxyl radical or a hydrogen atom, and w is zero or a positive integer, with the proviso that w is ≦250 and that the viscosity of the adhesion promoter (D) determined at 25° C. is from 0.0005 to 2000 mPas, and (E) at least one hydrosilylation catalyst.

The excellent adhesion is obtained only through the synergy of the adhesion promoters of the general formula (III) and the adhesion promoters of the general formula (IV). Advantages over the prior art are on the one hand an improved adhesion to problem plastics, particularly polycarbonate. In particular, an improved adhesion is obtained even following contact of the adhesive assembly with water.

The adhesion promoter (C) is a compound having at least one aliphatic unsaturated group and two phenyl skeletons per molecule. In combination with the adhesion promoter (D), the adhesion promoter (C) raises the adhesion of the composition further comprising components (A) and (B), so that the composition becomes tacky. The adhesion promoter (C) preferably contains aliphatic unsaturated groups such as alkenyl groups, and p-phenylene skeletons. The adhesion promoter (C) has the general formula (III), preferably the general formula (V).

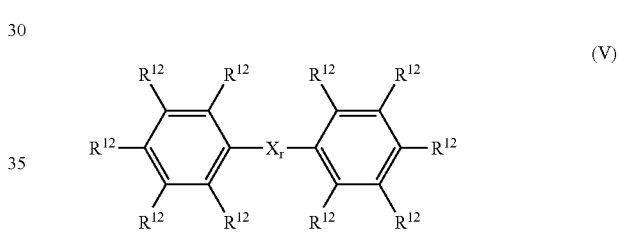

In the general formula (III) $R^{12}$ independently at each occurrence is a hydrogen atom, a hydroxyl group, a halogen atom, an alkyl, alkenyl, alkoxy, alkenyloxy or aryl group or a monovalent organic group containing an alkenyl, alkoxy, glycidyl, carbonyl, carbonyloxy, silyloxy or alkoxysilyl group. Preferably at least one, preferably from 1 to 4 radicals $R^{12}$ is or are an alkenyl group or a monovalent organic group containing an alkenyl group.

X is preferably selected from the group consisting of —($R^{13}$—)C(—$R^{13}$)—, —(O=)S(=O)—, —(O=)S—, —C(=O)—, —O—($CH_3$—)Si(—$CH_3$)—O—, —($CH_2$)$_5$— and —O—, in which $R^{13}$ independently at each occurrence is a hydrogen atom, a halogen atom or a substituted or unsubstituted alkyl, aryl, alkenyl or alkynyl group and s is a positive number which is at least 2, preferably from 2 to 4. The subscript r is preferably 0 or 1.

In $R^{12}$ and $R^{13}$, the alkyl and alkoxy groups preferably have 1 to 10 carbon atoms, more preferably 1 to 8 carbon atoms, and most preferably 1 to 6 carbon atoms. The aryl group preferably has 6 to 10 carbon atoms, more preferably 6 to 8 carbon atoms. The alkenyl, alkynyl, and alkenyloxy groups preferably have 2 to 10 carbon atoms, more preferably 2 to 8 carbon atoms, and most preferably 2 to 6 carbon atoms. The monovalent organic group preferably 1 to 12 carbon atoms, more preferably 2 to 10 carbon atoms, and most preferable 2 to 8 carbon atoms.

Examples of the alkyl, alkenyl, and aryl groups are, for alkyl groups, the methyl, ethyl, propyl, isopropyl, butyl, tert-butyl, hexyl, cyclohexyl, and octyl groups; for alkenyl groups the vinyl, allyl, propenyl, isopropenyl, butenyl, hexenyl, and cyclohexenyl groups, for aryl groups the phenyl, tolyl, xylyl, and aralkyl groups such as benzyl and phenylethyl groups. Examples of the alkynyl group include the acetylene group. Examples of the alkoxy and the alkenyloxy groups are methoxy, ethoxy, propoxy, isopropoxy, butoxy, tert-butoxy, methoxyethoxy, ethoxyethoxy, vinyloxy, allyloxy, propenoxy, isopropenoxy, and butenoxy groups.

Preferred embodiments of monovalent organic groups containing an alkenyl, alkoxy, glycidyl, carbonyl, carbonyloxy, silyloxy or alkoxysilyl group are, for example, the following groups:

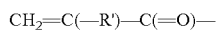

in which R' is a hydrogen atom or a methyl group,

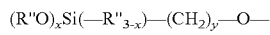

in which R" is a monovalent hydrocarbon group having 1 to 6 carbon atoms, such as an alkyl group, an alkenyl group, and/or an aryl group, x is 1, 2 or 3, and y is an integer from 0 to 6,

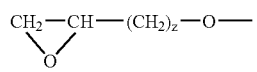

in which z is an integer from 1 to 6, and

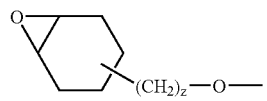

in which z is an integer from 1 to 6.

A further preferred embodiment of the adhesion promoter (C) is represented by the general formula (VI)

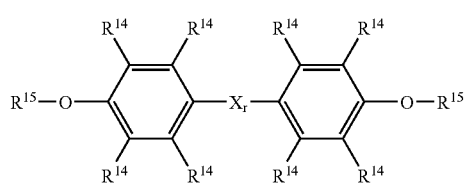

$R^{14}$ in the general formula (VI) is independently at each occurrence a hydrogen atom, hydroxyl group, halogen atom, alkyl group having 1 to 10 carbon atoms, preferably 1 to 8 carbon atoms, more preferably 1 to 6 carbon atoms, or alkenyl group having 2 to 10 carbon atoms, preferably 2 to 8 carbon atoms, more preferably 2 to 6 carbon atoms. $R^{15}$ likewise independently at each occurrence is an alkenyl group having 2 to 12, preferably 2 to 10, carbon atoms, a monovalent organic group containing an alkenyl group having 2 to 12, preferably 2 to 10, carbon atoms, or —$R^{16}{}_t$—$SiR^{17}$ or —CO—$R^{17}$. $R^{16}$ is an alkylene group having 1 to 6 carbon atoms, preferably 1 to 4 carbon atoms. The subscript t is 0 or 1. $R^{17}$ is an alkyl group having 1 to 6 carbon atoms, an alkenyl group having 2 to 6 carbon atoms or an alkoxy group having 1 to 6 carbon atoms. At least one of the radicals $R^{15}$ is preferably an alkenyl group or a monovalent organic group containing an alkenyl group. X and r are as defined above.

Examples of the alkyl and alkenyl groups and of the monovalent organic groups containing an alkenyl group are the same as indicated for $R^{12}$. Preferred embodiments of the alkylene group include for example the methylene, ethylene, trimethylene, tetramethylene, hexamethylene, and methylethylene group.

Particularly preferred embodiments of the adhesion promoter (C) of the general formula (VI) are:

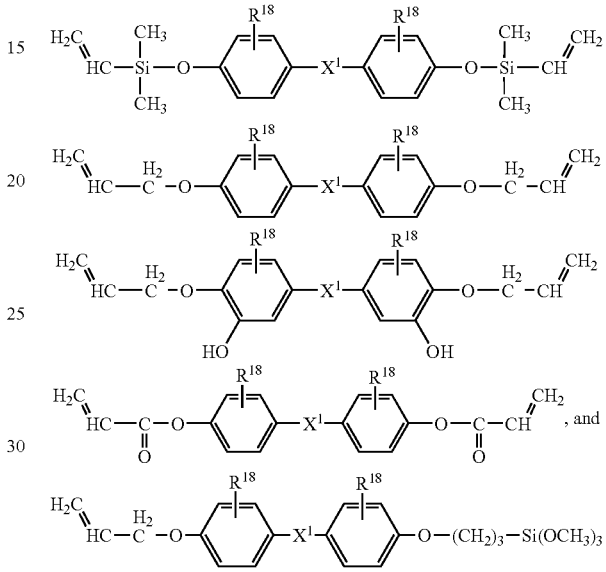

in which $X^1$ is —O—, —$CH_2$, —($CH_3$—)C(—$CH_3$)— or —O—($CH_3$—)Si(—$CH_3$)—O—, and $R^{18}$ independently at each occurrence is a hydrogen atom, a vinyl group or an allyl group.

For the effectiveness of the adhesion promoter (D) of the invention it is essential that it has only terminal Si—H groups, such as Si($CH_3$)$_2$H groups, for example, and is free from Si—H groups positioned within the chain. Only then is optimum adhesion observed.

Preferred radicals $R^1$ for the adhesion promoter (D) are methyl, phenyl, phenylene, and 3,3,3-trifluoropropyl groups, with particular preference being given to the methyl and phenyl radicals.

In the general formula (IV) w is an integer which is not more than 250, preferably not more than 50. With particular preference w is an integer from 3 to 60, more preferably from 3 to 15. The particularly preferred values for w arise from the fact that with these values the greatest effect—that is, the best adhesion—is observed. The reasons for this are firstly that for w greater than or equal to 3 the boiling point of the adhesion promoter (D) is already so high that it does not undergo volatilization prior to the actual reaction and secondly that with w less than or equal to 15 the adhesion promoter (D) is short enough to be very mobile within the silicone compound and in the case of the adhesion reaction to pass rapidly to the surface of the silicone compound, where together with the substrate, the adhesion promoter (C), and, if desired, the organohydropolysiloxane (B) it builds up the adhesion. Surprisingly, it is possible to obtain adhesion to polycarbonate polymers.

Preferred embodiments of the adhesion promoter (D) of the invention are, for example, copolymers comprising (Ph)$_2$SiO units and (CH$_3$)$_2$SiO units or (Ph)(CH$_3$)SiO and (CH$_3$)$_2$SiO units or —OSi—C$_6$H$_4$—SiO units, and (CH$_3$)$_2$SiO units, these copolymers each preferably having H(CH$_3$)$_2$SiO end groups, and also homopolymers comprising (CH$_3$)$_2$SiO units and containing H(CH$_3$)$_2$SiO end groups. Particular preference is given to compounds with the average compositions, determined for example by $^{29}$Si-NMR spectrum, as follows: H(CH$_3$)$_2$Si—O—(Si(CH$_3$)$_2$—O)$_n$—OSi(CH$_3$)$_2$H with n=5, 6, 8, 10 or 12, H(CH$_3$)$_2$Si—O—(Si(Ph)(CH$_3$)—O)—(Si(CH$_3$)$_2$—O)$_5$—OSi(CH$_3$)$_2$H and H(CH$_3$)$_2$Si—O—(—Si(Ph)(CH$_3$)—O)$_3$—(Si(CH$_3$)$_2$—O)$_8$—OSi(CH$_3$)$_2$H as adhesion promoters (D).

Components (A), (B), (C), and (D) may in each case comprise a single compound or any desired mixtures of different compounds of the respective component.

Preferred radicals R$^1$ are in each case independently of one another alkyl radicals such as methyl, ethyl, propyl, isopropyl, tert-butyl, n-pentyl, iso-pentyl, neo-pentyl, tert-pentyl, n-octyl, 2-ethylhexyl, 2,2,4-trimethylpentyl, n-nonyl, and octadecyl radicals, cycloalkyl radicals such as cyclopentyl, cyclohexyl, cycloheptyl, norbornyl, adamantylethyl, and bornyl radicals, aryl or alkaryl radicals such as phenyl, ethylphenyl, tolyl, xylyl, mesityl or naphthyl radicals, aralkyl radicals such as the benzyl, 2-phenylpropyl, and phenylethyl radicals, and also halogenated derivatives, and derivatives functionalized with organic groups of the foregoing radicals such as 3,3,3-trifluoropropyl, 3-iodopropyl, 3-isocyanatopropyl, aminopropyl, methacryloyloxymethyl or cyanoethyl radicals, for example. Preferred radicals R$^1$ contain 1 to 10 carbon atoms and are optionally substituted by halogen. Particularly preferred radicals R$^1$ are the methyl, phenyl, and 3,3,3-trifluoropropyl radicals, in particular the methyl radical.

The radicals R$^2$ are preferably amenable to a hydrosilylation reaction. Examples thereof are alkenyl and alkynyl radicals such as the vinyl, allyl, isopropenyl, 3-butenyl, 2,4-pentadienyl, butadienyl, 5-hexenyl, undecenyl, ethynyl, propynyl, and hexynyl radicals, cycloalkenyl radical, such as the cyclopentenyl, cyclohexenyl, 3-cyclohexenylethyl, 5-bicycloheptenyl, norbornenyl, 4-cyclooctenyl and cyclooctadienyl radicals, alkenylaryl radicals such as the styryl or styrylethyl radicals, and also halogenated and heteroatom-containing derivatives of the aforementioned radicals, such as the 2-bromovinyl, 3-bromo-1-propynyl, 1-chloro-2-methylallyl, 2-(chloromethyl)allyl, styryloxy, allyloxypropyl, 1-methoxyvinyl, cyclopentenyloxy, 3-cyclohexenyloxy, acryloyl, acryloyloxy, methacryloyl and methacryloyloxy radicals, for example. Preferred radicals R$^2$ are the vinyl, allyl, and 5-hexenyl radicals, particularly, the vinyl radical.

For the diorganopolysiloxanes (A) of the general formula (I) the viscosity determined at 25° C. is preferably from 0.1 to 30,000 Pas. The viscosity range from 1 to 30,000 Pas is particularly preferred. Depending on the nature of the addition-crosslinking compound, different viscosity ranges may be preferred. For the room-temperature-crosslinking two-component compounds (RTV-2) viscosities of from 0.1 to 10 Pas are most preferred; for liquid silicone rubber (LSR) compounds, from 1 to 100 Pas; and for high-temperature-crosslinking (HTV) compounds, from 2000 to 40,000 Pas.

Examples of R$^3$ are alkyl radicals such as the methyl, ethyl, propyl, isopropyl, tert-butyl, n-octyl, 2-ethylhexyl, and octadecyl radicals, and cycloalkyl radicals such as the cyclopentyl, cyclohexyl, norbornyl, and bornyl radicals, for example. Preferred radicals R$^3$ are hydrocarbon radicals having 1 to 10 carbon atoms. A particularly preferred radical R$^3$ is the methyl radical.

Examples of R$^4$ are the phenyl, tolyl, xylyl, biphenylyl, anthryl, indenyl, phenanthryl, naphthyl, benzyl, phenylethyl, and phenylpropyl radicals, and their halogenated derivatives and derivatives functionalized with organic groups, such as o-, m- or p-chlorophenyl, pentafluorophenyl, bromotolyl, trifluorotolyl, phenoxy, benzyloxy, benzyloxyethyl, benzoyl, benzoyloxy, p-tert-butylphenoxypropyl, 4-nitrophenyl, quinolyl and pentafluorobenzoyloxy radicals, for example.

Examples of hydrocarbon radicals R$^4$ having 2 to 20 carbon atoms are radicals such as 3-chloropropyl, 3-bromopropyl, 3,3,3-trifluoropropyl, 2-fluoroethyl, 1,1-dihydroperfluorododecyl, and 2-cyanoethyl radicals. Particularly preferred radicals R$^4$ are the phenyl radical and the 3,3,3-trifluoropropyl radical.

Preferred radicals R$^5$ are of the general formula (VII)

$$—(O)_s—(R^6)_t—(O)_u—(X)_w—(O)_u—(R^6)_t—(O)_s— \qquad (VII),$$

where s, t, u, and w independently of one another are 0, 1 or 2, the radicals R$^6$ can be identical or different and are each a divalent, unsubstituted or halogen-substituted hydrocarbon radical having 1 to 10 carbon atoms which is free from aliphatically unsaturated groups and in which individual carbon atoms may have been replaced by O, N, S or P atoms, for example —CH$_2$—, —CH$_2$—CH$_2$—, —CH$_2$—CH$_2$—CH$_2$—, —CF$_2$—, —CH$_2$—CF$_2$—, —CH$_2$—CH(CH$_3$)—, —C(CH$_3$)$_2$—, —CH$_2$—C(CH$_3$)$_2$—, —C(CH$_3$)$_2$—CH$_2$—, —CH$_2$—CH$_2$—O— or —CF$_2$—CF$_2$—O—, and X is a divalent radical such as -Ph-, -Ph-O-Ph-, -Ph-S-Ph-, -Ph-SO$_2$-Ph-, -Ph-CH$_2$-Ph-, -Ph-C(CH$_3$)$_2$-Ph-, —P-C(O)-Ph-, cyclohexylene or norbornylene, where Ph denotes a phenylene group. A particularly preferred radical R$^5$ is the phenylene radical.

Preferred organohydropolysiloxanes (B) of the general formula (II) are linear, branched, and cyclic organohydropolysiloxanes. The cyclic organohydropolysiloxanes are preferably composed of units of the formulae H(CH$_3$)SiO$_{2/2}$, (CH$_3$)(C$_6$H$_5$)SiO$_{2/2}$, (C$_6$H$_5$)$_2$SiO$_{2/2}$ or (CH$_3$)$_2$SiO$_{2/2}$, and mixtures thereof. The linear and branched organohydropolysiloxanes are preferably composed of units of the formulae (CH$_3$)$_3$SiO$_{3/2}$, H(CH$_3$)$_2$SiO$_{1/2}$, H(CH$_3$)SiO$_{2/2}$, (CH$_3$)(C$_6$H$_5$)SiO$_{2/2}$, (C$_6$H$_5$)$_2$SiO$_{2/2}$, (C$_6$H$_5$)SiO$_{3/2}$, (C$_6$H$_5$)SiO$_{3/2}$, (CH$_3$)$_2$SiO$_{2/2}$ or O$_{1/2}$(CH$_3$)$_2$S$_1$—C$_6$H$_4$—(CH$_3$)$_2$SiO$_{1/2}$ or mixtures thereof, with preferably from 0 to 18, more preferably from 1 to 18 mol percent on average of all Si-bonded organic radicals per molecule being composed of phenyl groups and phenylene groups.

Particularly preferred organohydropolysiloxanes (B) of the general formula (II) are linear and branched organohydropolysiloxanes. The linear and branched organohydropolysiloxanes are most preferably composed of units of the formulae (CH$_3$)$_3$SiO$_{1/2}$, H(CH$_3$)SiO$_{2/2}$, (CH$_3$)(C$_6$H$_5$)SiO$_{2/2}$, (C$_6$H$_5$)$_2$SiO$_{2/2}$, (C$_6$H$_5$)SiO$_{3/2}$, (C$_6$H$_5$)SiO$_{3/2}$, (CH$_3$)$_2$SiO$_{2/2}$, and mixtures thereof, with from 3 to 7 mol percent of all Si-bonded organic radicals per molecule with particular preference being of phenyl groups.

The organohydropolysiloxane (B) preferably contains from 5 to 40 SiH groups per molecule. The viscosity of constituent (B) measured at 25° C. is preferably from 0.002 to 1 Pas. Owing to the lability of the SiH group the constituent (B) may include a small amount, typically less than 100 ppm by weight, of Si-bonded OH groups, as an inevitable consequence of its preparation.

Preferred organohydropolysiloxanes (B) are, for example, copolymers containing $(Ph)_2SiO$ and $(CH_3)HSi$ units having $(CH_3)_3SiO_{1/2}$ end groups, copolymers containing $(Ph)_2SiO$, $(CH_3)_2SiO$, and $(CH_3)HSi$ units, copolymers containing $(Ph)SiO_{3/2}$, $(CH_3)_2SiO$, and $(CH_3)HSi$ units, copolymers containing $(Ph)(CH_3)SiO$, $(CH_3)_2SiO$, and $(CH_3)HSi$ units, copolymers containing $(Ph)(CH_3)SiO$ and $(CH_3)HSi$ units, copolymers containing —OSi—$C_6H_4$—SiO, $(CH_3)_2SiO$, and $(CH_3)HSi$ units, and copolymers containing —OSi—$C_6H_4$—SiO and $(CH_3)HSi$ units.

Further preferred are organohydropolysiloxanes (B) which have an average composition, determined, for example, by means of $^{29}$Si—NMR spectroscopy, of $(CH_3)_3$Si—O—(—Si(Ph)(CH_3)—O)_3—(Si(CH_3)H—O)_{10}—OSi(CH_3)_3$, $(CH_3)_3Si$—O—(—Si(Ph)(CH_3)—O)_3—(—Si(CH_3)_2—O)_3—(Si(CH_3)H—O)_{10}—OSi(CH_3)_3$ or $(CH_3)_3Si$—O—(—Si(Ph)(CH_3)—O)_3—(—Si(CH_3)_2—O)_3—(Si(CH_3)H—O)_{10}—OSi(CH_3)_3$, and also copolymers composed of —Si(Ph)—$O_{3/2}$, —Si(CH_3)H—O, and —Si(CH_3)_2—O units with a molar ratio of 2:17:4 and having $(CH_3)_3$ Si—O end groups.

Preference is given to a composition of the invention containing 100 parts by weight of diorganopolysiloxanes (A) of the general formula (I), from 0.1 to 50 parts by weight of organohydropolysiloxane (B) of the general formula (II), from 0.1 to 15 parts by weight of the organic adhesion promoter (C) of the general formula (III), from 0.01 to 15 parts by weight of the SiH-containing adhesion promoter (D) of the general formula (IV), a catalytic amount of at least one hydrosilylation catalyst (E) and also, if desired, from 0 to 100 parts by weight of a reinforcing filler (F), from 0 to 5 parts by weight of an inhibitor (G), and from 0 to 60 parts by weight of further additives (H).

Particular preference is given to a composition containing 100 parts by weight of diorganopolysiloxanes (A) of the general formula (I), from 0.5 to 10 parts by weight of organohydropolysiloxane (B) of the general formula (II), from 0.5 to 7 parts by weight of adhesion promoter (C) of the general formula (III), from 0.2 to 5 parts by weight of adhesion promoter (D) of the general formula (IV), a catalytic amount of at least one hydrosilylation catalyst (E) and also, if desired, from 10 to 45 parts by weight of a reinforcing filler (F), from 0.01 to 0.5 part by weight of an inhibitor (G), and from 0 to 60 parts by weight of further additives (H).

The hydrosilylation catalyst (E) serves as catalyst for the addition reaction, referred to as hydrosilylation, between the aliphatically unsaturated hydrocarbon radicals $R^2$ of the diorganopolysiloxanes (A) of the general formula (I) and the silicon-bonded hydrogen atoms of the organohydropolysiloxanes (B) of the general formula (II). Many suitable hydrosilylation catalysts are known in the prior art. In principle it is possible to use any hydrosilylation catalysts which conform to the prior art and are used in addition-crosslinking silicone rubber compounds.

As hydrosilylation catalyst (E) it is possible with preference to use metals, such as platinum, rhodium, palladium, ruthenium, and iridium, for example, preferably platinum, and also their compounds. The metals may where appropriate be fixed on finely divided support materials such as activated carbon, or on metal oxides such as alumina, or silica.

It is preferred to use platinum and platinum compounds. Particular preference is given to using those platinum compounds which are soluble in polyorganosiloxanes. As soluble platinum compounds it is possible, for example, to use the platinum-olefin complexes of the formulae $PtCl_2$(olefin)$_2$ and $HPtCl_3$(olefin), in which the olefins used are preferably alkenes having 2 to 8 carbon atoms such as ethylene, propylene, isomers of butene and octene, or cycloalkanes having 5 to 7 carbon atoms, such as cyclopentene, cyclohexene, and cycloheptene, for example. Further soluble platinum catalysts are for example the platinum-cyclopropane complex of the formula $(PtCl_2C_3H_6)_2$, the reaction products of hexachloroplatinic acid with alcohols, ethers, and aldehydes, or mixtures thereof, or the reaction product of hexachloroplatinic acid with methylvinylcyclotetrasiloxane in the presence of sodium bicarbonate in ethanolic solution. Platinum catalysts with phosphorus, sulfur, and amine ligands can be used as well, an example being $(Ph_3P)_2PtCl_2$. Particular preference is given to complexes of platinum with vinylsiloxanes, such as sym-divinyltetramethyldisiloxane, for example.

The amount of the hydrosilylation catalyst (E) used is guided by the desired crosslinking rate and also by economic aspects. Normally for each 100 parts by weight of diorganopolysiloxanes (A) it is preferred to use from $1\times10^{-5}$ to $5\times10^{-2}$ parts by weight, in particular from $1\times10^{-4}$ to $1\times10^{-2}$ parts by weight, of platinum catalysts, calculated as platinum metal.

Self-adhesive addition-crosslinking silicone compositions may, where appropriate, comprise further constituents, such as fillers (F), inhibitors (G), and further additives (H), such as stabilizers, pigments, and further catalysts, for example.

In order to obtain sufficiently high mechanical strength in the crosslinked silicone rubber it is preferred to incorporate actively reinforcing fillers (F) as a constituent into the addition-crosslinking silicone compositions. Actively reinforcing fillers (F) used are principally precipitated and fumed silicas and also mixtures thereof. The specific surface area of these actively reinforcing fillers is generally at least 50 $m^2$/g, and preferably in the range of 100 to 400 $m^2$/g as determined by the BET method. Actively reinforcing fillers of this kind are very well-known materials within the field of silicone rubbers. The silica fillers may be hydrophilic in nature or may have been hydrophobicized by known methods. Where hydrophilic fillers are mixed in it is generally necessary to add a hydrophobicizing agent. The amount of actively reinforcing filler (F) in the crosslinkable compound of the invention is in the range from 0 to 70% by weight, preferably from 0 to 50% by weight.

The silicone rubber compound of the invention may optionally include as a constituent further additives (H) in a fraction of up to 70% by weight, preferably from 0.0001 to 40% by weight. These additives can be, for example, inert fillers, quartz, talc, resinous polyorganosiloxanes, dispersing assistants, solvents, adhesion promoters, pigments, dyes, plasticizers, organic polymers, heat stabilizers, and so on. These include additives such as activated carbon, quartz flour, diatomaceous earth, clays, chalk, lithopones, carbon blacks, graphite, metal oxides, metal carbonates, metal sulfates, metal salts of carboxylic acids, metal dusts, fibers, such as glass fibers, polymer fibers, for example, polymer powders, dyes, pigments, and so on.

It is additionally possible for inhibitors (G) to be present as a further additive, serving to tailor the processing time, onset temperature, and crosslinking rate of the compounds of the invention. These inhibitors (G) are likewise well known within the field of addition-crosslinking compounds. Examples of customary inhibitors are acetylenic alcohols such as 1-ethynyl-1-cyclohexanol, 2-methyl-3-butyne-2-ol, and 3,5-dimethyl-1-hexyne-3-ol, 3-methyl-1-dodecyne-3-ol, polymethylvinylcyclosiloxanes such as 1,3,5,7-tetravinyltetramethyltetracyclosiloxane, low molecular weight silicone oils containing $(CH_3)(CHR=CH)SiO_{2/2}$ groups and optionally $R_2(CHR=CH)SiO_{1/2}$ end groups, such as divinyltetramethyldisiloxane and tetravinyldimethyldisiloxane, trialkyl cyanurates, alkyl maleates such as diallyl maleate, dimethyl maleate and diethyl maleate, alkyl fumarates such as diallyl fumarate and diethylfumarate, organic hydroperoxides such as cumene hydroperoxide, tert-butyl hydroperoxide and pinane hydroperoxide, organic peroxides, organic sulfoxides, organic amines, diamines, and amides, phosphanes and phosphites, nitriles, triazoles, diaziridines, and oximes, for example. The action of these inhibitors (H) depends on their chemical structure, and so must be determined individually. The amount of inhibitor(s) in the compositions of the invention is preferably from 0 to 50,000 ppm, more preferably from 20 to 2000 ppm, and in particular, from 100 to 1000 ppm.

As an option it is possible to add further constituents (I) which are used in conventional self-adhesive addition-crosslinking silicone rubber compounds. Preferably these are organopolysiloxane compounds. Even more preferable are cyclic or linear organopolysiloxane compounds having at least one SiH group and at least one alkoxysilyl and/or glycidyl group per molecule. Such compounds are described for example in U.S. Pat. No. 5,312,855, whose content in that respect is to be considered part of the present disclosure, and is therefore incorporated by reference.

Moreover, in one preferred embodiment, the addition-crosslinking silicone compositions of the invention further contain organosilicon compounds which contain epoxy groups and hydrolyzable groups and are of the general formula (VII)

$$R^7{}_g R^8{}_h R^9{}_i SiO_{(4-g-h-i)/2} \qquad (VII),$$

their partial hydrolysates or mixtures thereof, where
$R^7$ is a hydrogen, hydroxyl or an optionally halogen-substituted or cyano-substituted, optionally O, N, S or P-containing saturated monovalent hydrocarbon radical having 1 to 20 carbon atoms,
$R^8$ is an optionally halogen-substituted, optionally O, N, S or P-containing monovalent hydrocarbon radical having 2 to 20 carbon atoms which contains at least one epoxy group,
$R^9$ is a hydrolyzable, monovalent, optionally halogen-substituted, optionally O, N, S or P-containing hydrocarbon radical having 1 to 20 carbon atoms which is attached to Si via an Si—O—C, Si—O—N or Si—N linkage,
g is a number from 0 to 4,
h is a number greater than 0 and less than 4, and
I is a number greater than 0 and less than 4, with the proviso that the sum (h+i) is greater than 0 and not more than 4, and that the sum (g+h+i) is at least 4. Each of $R^7$, $R^8$, and $R^9$ may be the same or different.

Examples of hydrocarbon radicals $R^7$ are alkyl radicals such as the methyl, ethyl, n-propyl, isopropyl, tert-butyl, n-pentyl, iso-pentyl, neo-pentyl, tert-pentyl, n-octyl, 2-ethylhexyl, 2,2,4-trimethylpentyl, n-nonyl, and octadecyl radicals, cycloalkyl radicals such as the cyclopentyl, cyclohexyl, cycloheptyl, norbornyl, adamantylethyl, and bornyl radicals, aryl radicals such as the phenyl, ethylphenyl, tolyl, xylyl, mesityl, and naphthyl radicals, aralkyl radicals such as the benzyl, phenylethyl, and phenylpropyl radicals, alkenyl and alkynyl radicals such as the vinyl, allyl, isopropenyl, 3-butenyl, 2,4-pentadienyl, butadienyl, 5-hexenyl, undecenyl, ethynyl, propynyl, and hexynyl radicals, cycloalkenyl radicals such as the cyclopentenyl, cyclohexenyl, 3-cyclohexenylethyl, 5-bicycloheptenyl, norbornenyl, 4-cyclooctenyl, and cyclooctadienyl radicals, aralkenyl radicals such as the phenylethenyl and phenylethynyl radicals, and also halogen-substituted or heteroatom-containing derivatives of the aforementioned radicals, such as the 3-chloropropyl, 3-bromopropyl, decafluoro-1,1,2,2-tetrahydrooctyl, (p-chloromethyl)phenyl, (p-chloromethyl)phenethyl, hydroxymethyl, hydroxyethyl, hydroxypropyl, hydroxybutyl, 2-bromovinyl, 2-allyloxymethyl, acetyl, acetoxymethyl, acetoxyethyl, acetoxypropyl, 3-phenoxypropyl, benzoyloxypropyl, mercaptopropyl, cyanoethyl, cyanopropyl, 3-cyanobutyl, 3-isocyanatopropyl, 2-(carbomethoxy)ethyl, 10-(carbomethoxy)decyl, 2-(carboxymethylthio)ethyl, 3-carboxypropyl, aminomethyl, aminoethyl, aminopropyl, aminohexyl, aminoethylaminopropyl, 3-(N-allylamino)propyl, (aminoethylaminomethyl)phenethyl, m-aminophenyl, 3-(m-aminophenoxy)propyl, 3-acryloyloxypropyl, 3-acryloyloxy-2-hydroxypropyl, 4-(acryloyloxymethyl)phenethyl, methacryloyloxymethyl, methacryloyloxyethyl, and methacryloyloxypropyl radicals, for example. Preferred radicals $R^7$ are the methyl, ethyl, propyl, butyl, octyl, vinyl, allyl, phenyl, 3,3,3-trifluoropropyl, and cyanopropyl radical. Particularly preferred radicals $R^7$ are the methyl, vinyl, and phenyl radicals.

Examples of the radicals $R^8$ are the epoxyethyl, 2,3-epoxypropyl, 3,4-epoxybutyl, 5,6-epoxyhexyl, 9,10-epoxydecyl, glycidyloxy, 3-glycidyloxypropyl, glycidyloxyisobutyl, 2-methylglycidyloxypropyl, 3-phenylglycidyloxypropyl, glycidyloxyphenylnonyl, glycidyloxybenzylethyl, 3,4-epoxycyclohexyl, 2-(3,4-epoxycyclohexyl)ethyl, 3-(3,4-epoxycyclohexyl)propyl, 1,4-epoxycyclohexyl, and 2-(1,4-epoxycyclohexyl)ethyl radicals. Preferred radicals $R^8$ are the 3,4-epoxycyclohexyl, 3-(3,4-epoxycyclohexyl)propyl and glycidlyoxypropyl radical. Preferably radical $R^8$ has 2 to 10 carbon atoms. The most preferred radical $R^8$ is the glycidlyoxypropyl radical.

Examples of the radicals $R^9$ are hydrolyzable, monovalent, optionally halogen-substituted hydrocarbon radicals having 1 to 20 carbon atoms, in which individual hydrogen atoms may have been replaced by O, N, S or P atoms, and which are attached to Si via an Si—O—C, Si—O—N or Si—N linkage. Preferred examples of the radicals $R^9$ are:
a) alkoxy, enoxy or aryloxy groups of the general formula —$OR^{10}$, such as the methoxy, ethoxy, n-propoxy, isopropoxy, n-butoxy, sec-butoxy, tert-butoxy, 2-ethylbutoxy, 2-ethylhexoxy, vinyloxy, allyloxy, isopropenyloxy, cyclobutenyloxy, cyclohexenyloxy, 1,3-butadienyloxy, propargyloxy, phenoxy, benzyloxy or m,p-vinylbenzyloxy radicals;
b) acyloxy groups of the general formula —$OCOR^{10}$, such as the formyloxy, acetoxy, 2-ethylhexanoxy, acryloyloxy, methacryloyloxy, benzoyloxy, and norbornylacetoxy radicals;
c) amino groups of the general formula —$NH_2$, —$NHR^{10}$ or —$NR^{10}{}_2$, such as the dimethylamino, diisopropylamino, allylamino, n-butylamino, sec-butylamino, and cyclohexylamino radicals;
d) oxime groups of the general formula —$ON=CH_2$, —$ON=CHR^{10}$ or —$ON=CR^{10}{}_2$, such as the methyl ethyl ketoxime, methyl isobutyl ketoxime, methyl n-amyl ketoxime or dimethyl ketoxime radicals;
e) amide groups of the general formula —NH—C(=O)—$R^{10}$ or —$NR^{10}$—C(=O)—$R^{10}$, such as the N-methylbenzamido and N-methylacetamido radicals;
f) amineoxy groups of the general formula —$ONH_2$, —$ONHR^{10}$ or —$ONR^{10}{}_2$, such as the hydroxylamino radical; or
g) halogen-substituted or heteroatom-containing derivatives, or derivatives of more complex composition, of the aforementioned radicals, such as p-aminophenoxy, 2-methoxyethoxy, 1-methoxy-2-propoxy, 1-methoxyisopropenyloxy, methoxyethoxyethoxy, 1-methoxy-2-methylpropenyloxy, acryloyloxymethoxy, methacryloyloxy(polyethyleneoxy), furyloxy, N-vinylformamido radical, and also —O—Ph—C(=O)—Ph, —O—C(CF$_3$)=CH—C(=O)—CF$_3$, —O—C(CH$_3$)=CH—C(=O)—CH$_3$, —O—C(CH$_3$)$_2$—CH=CH$_2$, —NH—C(=O)—CH$_3$, —O—C(=O)—CH$_2$Br, —O—C(=O)—CF$_3$, —O—C(=O)—C≡CH or —O—CH$_2$—C(=O)—O—Si(CH$_3$)$_3$.

The additional constituents (I) are used preferably in amounts of from 0 to 5% by weight, more preferably from 0 to 1% by weight, very preferably from 0 to 0.5% by weight. The addition of these compounds may bring about a further improvement in the adhesion to different metals and organic plastics, and also a broadening of the range of materials to which the composition of the invention adheres.

Preference is given to addition-crosslinking silicone compositions of the invention wherein the composition is composed of two components (i) and (ii), component (i) comprising the constituents (A), (B), and (D) and also, if desired, (C), and component (ii) comprising the constituents (A) and, if desired, (C) or (D), with the proviso that (C) must not be present in both components simultaneously but must be present at least in one of components (i) and (ii).

Compounding of the self-adhesive addition-crosslinking silicone compositions takes place by mixing components (A), (B), (C), (D), and (E) and also, where used, (F), (H) or (G) in any order.

Crosslinking of the self-adhesive addition-crosslinking silicone compositions takes place preferably by heating, preferably at from 30 to 250° C., more preferably at least 50° C., in particular at at least 100° C., preferably at not more than 200° C., in particular at not more than 180° C.

The invention further provides the addition-crosslinked silicone elastomers based on the composition of the invention comprising components (A), (B), (C), (D), and (E), as well as a process for preparing the addition-crosslinked silicone elastomers, which comprises mixing components (A), (B), (C), (D), and (E).

The invention additionally provides a method of joining two substrates by means of the addition-crosslinking silicone elastomers, which comprises applying the composition of the invention to a substrate and heating it preferably at from 30 to 250° C.

By crosslinking the addition-crosslinking silicone compositions of the invention on a substrate or between at least two substrates it is possible to join the addition-crosslinking silicone compositions to the substrates by applying the addition-crosslinking silicone compositions to the substrate and then crosslinking them, preferably by heating, to form a composite material.

The self-adhesive addition-crosslinking silicone compositions can in particular be employed with advantage wherever there is a desire for effective adhesion between the addition-crosslinked silicone elastomer and a substrate composed preferably of organic plastics, metals or glasses. The substrate may be a molding, film or coating.

The self-adhesive addition-crosslinking silicone compositions are suitable for producing composite material by coating, adhesive bonding, and casting and for producing moldings. In particular the self-adhesive addition-crosslinking silicone compositions are suitable for encapsulating and for adhesively bonding electrical and electronic components and also for producing composite moldings. By composite moldings are meant in this case a unitary molding made from a composite material which is composed of a silicone elastomer part, produced from the silicone compositions, and at least one substrate in such a way that a firm, lasting bond is made between the two parts. A composite molding of this kind is preferably produced by processing an organic plastic to a molded article and then joining the silicone compositions of the invention to said article and carrying out crosslinking, which can be done, for example, in an injection molding process, by means of extrusion or by what is called the press molding process. Composite materials, and composite moldings in particular, can be employed in a very wide range of applications: for example, in the electronics, household appliance, utility product, construction, and automobile industries, in medical engineering, in the production of sports goods and leisure goods, etc.

The outstanding adhesion associated with the self-adhesive addition-crosslinking silicone compositions comes about as a result of the interaction of the four essential constituents (A), (B) (organohydropolysiloxane), (C), and (D) (adhesion promoter).

In the above description the letters in each case adopt their definition independently of one another.

In the examples below, unless specifically stated otherwise, all pressures are atmospheric pressure, all temperatures are 20° C., and all parts are parts by weight (pbw).

For the compositions of inventive examples 1 to 3 and of the comparative examples 1 to 3, the base materials (GM1 and GM2), organohydropolysiloxane (B1) and (B2), and adhesion promoters (C) and (D) were used below as constituents.

Base Material 1 (GM1)

A twin-screw extruder with sigma blades (Werner & Pfleiderer) was charged with 255 parts of a vinyldimethylsiloxy-terminated polydimethylsiloxane having a viscosity of 20 Pas, the charge was heated to 150° C., and 180 parts of a hydrophobic fumed silica having a BET specific surface area of 300 m$^2$/g and a carbon content of 3.95% by weight were added. This gave a material of high viscosity which was subsequently diluted with 165 parts by weight of the abovementioned polydimethylsiloxane. Kneading under vacuum (10 mbar) at 150° C. removed volatile constituents over the course of an hour. 100 parts of this mixture were mixed on the roll at a temperature of 25° C. with 0.05 part of 1-ethynyl-1-cyclohexanol as an inhibitor for extending the cure time at room temperature and 10 ppm of platinum in the form of a platinum-divinyltetramethyldisiloxane complex in vinyl-terminated polydimethylsiloxane, available from ABCR GmbH & Co, Germany, to form a homogeneous material.

Base Material 2 (GM2)

589.4 parts of a vinyldimethylsiloxy-terminated polydimethylsiloxane having a Brabender plasticity of 630 mkp, corresponding to an average molecular weight of approximately 500,000 g/mol, were mixed with 252.6 parts of a hydrophobic fumed silica having a BET surface area of 300 m$^2$/g and a carbon content of 3.95% by weight, which was metered portionwise into a twin-screw extruder with sigma blades (Werner & Pfleiderer) over 4 hours to form a homogeneous material. 500 g of the base material obtained in this way were mixed on a roll at a temperature of 20° C. with 0.15 part of 1-ethynyl-1-cyclohexanol as inhibitor and 5 ppm of platinum in the form of platinum-divinyltetramethyldisiloxane complex in vinyl-terminated polydimethylsiloxane, available from ABCR GmbH & Co, Germany, to form a homogeneous material.

Polyorganohydrosiloxane 1 (B1)

A stirrer is charged with 5.0 kg of a trimethylsiloxy-terminal polymethylhydrosiloxane, (CH$_3$)$_3$Si—(OSiHCH$_3$)$_n$—O—Si(CH$_3$)$_3$, which according to $^{29}$Si-NMR possesses a number-average chain length of n=53, and 5.0 kg of a trimethylsiloxy-terminal siloxane copolymer, composed of dimethylsiloxy and methylphenylsiloxy units in a molar ratio of 15.2:21.8, with a viscosity of 0.1 Pas measured at 25° C. With continuing stirring, 1.8 g of phosphonitrile chloride, prepared according to U.S. Pat. No. 4,203,913, are added at room temperature. A vacuum of <20 mbar is applied and then the mixture is stirred for 5 minutes, after which the vacuum is broken with nitrogen. The mixture is subsequently stirred for 2 hours at a temperature of 100° C. 14 g of hexamethyldisilazane are added and stirring is continued for 15 minutes. Finally a vacuum of <10 mbar is applied, the mixture is freed from volatile constituents at 100° C. for 1 hour, during which stirring continues, the vacuum is broken with nitrogen and the reaction mixture is cooled to room temperature and the reaction product isolated by filtration. The product is trimethylsiloxy-terminal polyorganohydrosiloxane which is composed of —O—Si(CH$_3$)$_2$, —O—SiH(CH$_3$), and —O—Si(CH$_3$)Ph units in a molar ratio of 15.2:63.0:21.8 and at 25° C. has a viscosity of 32.1 mm$^2$/s. The product contains on average 17 Si—H groups per molecule.

Polyorganohydrosiloxane 2 (B2)

This is a trimethylsiloxy-terminal polyorganohydrosiloxane containing on average 34 —O—SiH(CH$_3$) units per molecule. It is prepared in accordance with the prior art.

Adhesion Promoter 1 (C)

This is 2,2-bis(4-allyloxyphenyl)propane. The compound is prepared according to T. N. Sorrell and H. Yuan, J. ORG. CHEM. 62, (1997) 1899-1902.

Adhesion Promoter 2 (D)

This is an α,ω-hydrodimethylsiloxypolydimethylsiloxane containing on average 10 dimethylsiloxy units according to $^{29}$Si-NMR. It is prepared in accordance with the prior art.

EXAMPLES

The base material (GM) was mixed homogeneously with polyorganohydrosiloxane (B1, B2), adhesion promoter (C), and adhesion promoter (D), and then the mixture was degassed at room temperature under vacuum. The amounts of the individual components used in the respective mixture are listed in Table 1 in parts by weight. The silicone rubber mixtures thus obtained were subjected to adhesion tests.

Characterization of the Adhesion of the Compositions of Inventive Examples 1 to 3 and Comparative Examples C1 to C3

A substrate strip measuring 60×25×2 mm is inserted into a stainless steel compression mold and the mold is filled with the addition-crosslinking silicone elastomer material under test. Vulcanization takes place for 3 minutes at a temperature of 120° C. under a pressure force of 30 tonnes. Thereafter the laminate is conditioned in a forced-air drying cabinet at 100° C. for 1 hour. Following removal of the laminate formed from substrate strip and silicone elastomer strip, and a 3-day storage period, the rigid substrate element is clamped in firmly and a determination is made of the maximum release force required to detach the adhering silicone elastomer strip in a peel test. The release force is determined in accordance with DIN 53531 and is reported in N/mm with the following particularities: the thickness of the carrier plate is 2 mm and the thickness of the elastomer over the carrier plate is 4 mm. For each example 5 laminates are measured, the release force is determined as the mean value, and the proportion of cohesive failure is determined in percent. Cohesive failure of 0% means that the silicone elastomer was detached fully and without residue from the substrate surface. Cohesive failure of 100% means that the delamination occurred exclusively by crack propagation within the silicone elastomer.

Substrates

The adhesion of both the inventive and noninventive addition-crosslinked silicone elastomers was tested on polycarbonate (PC) [Makrolon® (Bayer AG) and LEXAN® (GE Plastics)]. All of the mixtures were additionally tested on the following substrates, and in all cases with the exception of Comparative Example 3 achieved good to very good adhesion with generally cohesive failure: polybutylene terephthalate (PBT), such as Ultradur® (BASF AG; 30% glass fiber (GF)), Pocan® B3235 (Bayer AG) and Valox® (GE Plastics), polyamides, such as Durethan® BKV30 (Bayer AG; 30% GF), Grilamid TR 55 (EMS-Chemie GmbH) and Ultramid (BASF), and aluminum (industrial grade; not primed).

TABLE 1

Examples, formulas, breaking tension in [N/mm], and portion of cohesive failure in [%], plastic: Lexan

| | | | | | | | Dry Storage PC[1] | | Wet Storage PC[1] | |
|---|---|---|---|---|---|---|---|---|---|---|
| | GM1 | GM2 | B1 | B2 | C | D | [N/mm] | [%] | [N/mm] | [%] |
| Comparative Example C1 | 100 | — | 3.2 | — | — | — | —[2] | —[2] | —[2] | —[2] |
| Comparative Example C2 | 100 | — | 3.2 | — | 1.7 | — | 12.4 | 100 | —[2] | —[2] |
| Comparative Example C3 | 100 | — | — | 0.7 | 1.7 | — | 8.8 | 80 | —[2] | —[2] |
| Inventive Example 1 | 100 | — | 3.2 | — | 1.7 | 1 | 14.3 | 100 | 11 | 100 |
| Inventive Example 2 | 100 | — | — | 0.7 | 1.7 | 1 | 9.5 | 100 | 7.2 | 60 |
| Inventive Example 3 | — | 100 | 3.5 | — | 2 | 1.4 | 12.5 | 100 | 9.6 | 80 |

[1]Dry storage PC: the silicone-polycarbonate assembly is stored in air; wet storage PC: the silicone-polycarbonate assembly is stored in boiling water for 24 hours prior to the measurement

[2]no adhesion

The values reported in Table 1 demonstrate the high adhesion between the addition-crosslinked silicone elastomer of the invention (inventive examples 1, 2, and 3) and polycarbonate. As is evident from comparative example 1 the absence of constituents (C) and (D) does not lead to high adhesion. As is evident from comparative example 2, the presence of constituent (C) alone also leads only to good adhesion on dry storage, whereas on wet storage the good adhesion is lost. As is additionally evident from inventive examples 1 and 2, with the preferred crosslinkers (B) containing phenyl groups the adhesion obtained is further improved in comparison to the crosslinkers without phenyl groups.

Only the inventive combination of constituents (C) and (D) leads to sufficiently good adhesion in all cases. This illustrates the synergy of the adhesion-promoting constituents (C) and (D) of the silicone composition of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An addition-crosslinking silicone composition comprising at least one organopolysiloxane (A) bearing minimally two aliphatically unsaturated groups, at least one organohydropolysiloxane (B), and at least one hydrosilylation catalyst, further comprising at least two adhesion promoters, a first adhesion promoter which is a multi-nuclear aryl compound (C) bearing at least one aliphatically unsaturated group or substituent having at least one aliphatically unsaturated group, and a second adhesion promoter (D) which is an organopolysiloxane bearing at least one terminal silicon-bonded hydrogen, and having, as silicon-bonded moieties other than terminal silicon-bonded hydrogen, moieties selected from the group consisting of hydroxyl and monovalent, optionally halogen substituted $C_{1-20}$ hydrocarbon radicals free of aliphatically unsaturated groups, wherein individual carbon atoms may be replaced by O, N, S, or P atoms.

2. An addition-crosslinking silicone composition, comprising
   (A) organopolysiloxanes comprising units of the formula (I)

$$R^1_a R^2_b SiO_{(4-a-b)/2} \quad (I),$$

where
   $R^1$ is hydroxyl radical or a monovalent, unsubstituted or halogen-substituted $C_{1-20}$ hydrocarbon radical free from aliphatically unsaturated groups and in which individual carbon atoms are optionally replaced by O, N, S or P atoms,
   $R^2$ is a monovalent, aliphatically unsaturated, unsubstituted or halogen-substituted $C_{1-10}$ hydrocarbon radical in which individual carbon atoms are optionally replaced by O, N, S or P atoms,
   a is 0,2 or 3, and
   b is 0,1,2 or 3,
   with the proviso that the sum (a+b) is $\leq 3$, that per molecule there are on average at least two aliphatically unsaturated radicals $R^{2}$, and that the viscosity of the organopolysiloxanes (A) determined at 25° C. is from 0.001 to 40,000 Pas;

(B) organohydropolysiloxanes comprising units of the formula (II)

where
   $R^3$ is a monovalent aliphatically saturated $C_{1-20}$ hydrocarbon radical,
   $R^4$ is (a) a monovalent, unsubstituted or halogen-substituted $C_{6-15}$ hydrocarbon radical which comprises at least one aromatic $C_6$ ring, (b) a monovalent, unsubstituted or halogen-substituted, saturated $C_{2-20}$ hydrocarbon radical in which individual carbon atoms are optionally replaced by O, N, S or P atoms, or a mixture of a) and b);
   $R^5$ is a divalent, unsubstituted or halogen-substituted $C_{6-20}$ hydrocarbon radical in which individual carbon atoms are optionally replaced by O, N, S or P atoms, and which is Si-bonded on both sides,
   c is 0, 1, 2 or 3,
   d is 0, 1, 2 or 3,
   e is 0, 1, 2 or 3, and
   f is 0, 1, 2 or 3,
   with the proviso that the sum (c+d+2e+f) is $\leq 3$, that the organohydropolysiloxane (B) contains on average per molecule at least 3 SiH groups, and that the viscosity of the organohydropolysiloxane (B) determined at 25° C. is from 0.0005 to 100 Pas, (C) at least one adhesion promoter of the general formula (III):

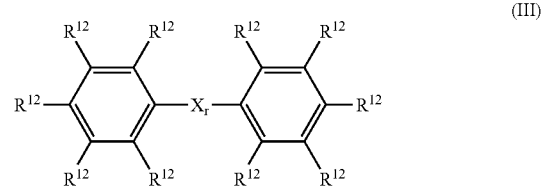

where
   $R^{12}$ is a hydrogen atom, a hydroxyl group, a halogen atom, an alkyl, alkenyl, alkoxy, alkenyloxy or aryl group or a monovalent organic group which contains an alkenyl, alkoxy, glycidyl, carbonyl, carbonyloxy, silyloxy or alkoxysilyl group, at least one of the radicals $R^{12}$ being an alkenyl group or a monovalent organic group containing an alkenyl group, and
   X is —$(R^{13}$—$)C(—R^{13})$—, —(O$=$)S($=$O)—, —(O$=$)S—, —C($=$O)—, —O—(CH$_3$—)Si(—CH$_3$)—O—, —(CH$_2$)$_5$— or —O—
   in which
   $R^{13}$ is a hydrogen atom, a halogen atom or a substituted or unsubstituted alkyl, aryl, alkenyl or alkynyl group,
   s is a positive number which is at least 2, and
   r is 0 or 1, (D) at least one adhesion promoter of formula (IV)

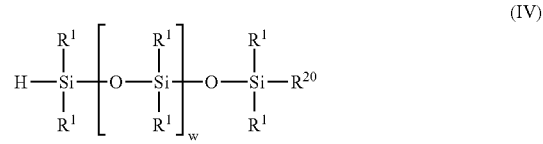

in which

R$^1$ is as defined above,

R$^{20}$ is a hydroxyl radical or a hydrogen atom, and w is zero or a positive integer, with the proviso that w is ≦250 and that the viscosity of the adhesion promoter (D) determined at 25° C. is from 0.0005 to 2000 mPas, and (E) at least one hydrosilylation catalyst.

3. The silicone composition of claim 1, wherein at least one adhesion promoter (C) of the formula (III) is selected from the group consisting of

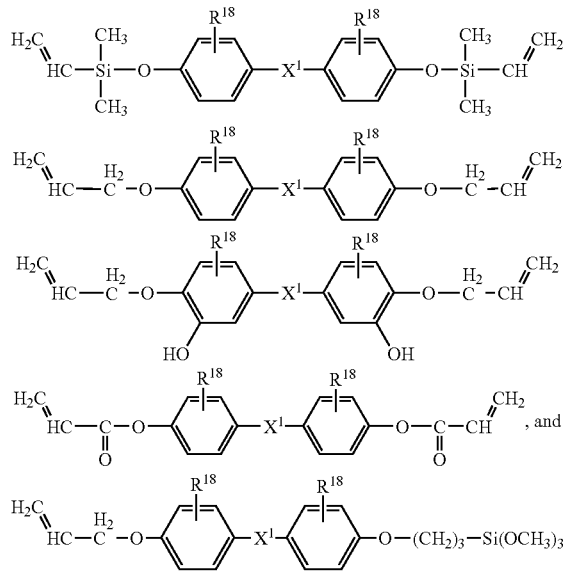

wherein

X$^1$ is —O—, —CH$_2$, —(CH$_3$—)C(—CH$_3$)— or —O—(CH$_3$—)Si(—CH$_3$)—O—, and

R$^{18}$ independently at each occurrence is a hydrogen atom, a vinyl group or an allyl group.

4. The silicone composition of claim 1, further comprising at least one reinforcing filler (F) and at least one inhibitor (G).

5. The silicone composition of claim 1, wherein the organohydropolysiloxane (B) contains from 5 to 40 SiH groups per molecule and the viscosity measured at 25° C. is from 0.002 to 1 Pas.

6. The silicone composition of claim 1, wherein the organohydropolysiloxane (B) contains phenyl groups as radical R$^4$.

7. The silicone composition of claim 1, wherein at least one adhesion promoter (D) is selected from the group consisting of H(CH$_3$)$_2$Si—O—(Si(CH$_3$)$_2$—O)$_n$—OSi (CH$_3$)$_2$H with n being one of 5, 6, 8, 10 and 12, H(CH$_3$)$_2$Si—O—(Si(Ph)(CH$_3$)—O)—(Si(CH$_3$)$_2$—O)$_5$—OSi(CH$_3$)$_2$H, and H(CH$_3$)$_2$Si—O—(—Si(Ph)(CH$_3$)—O)$_3$—(Si(CH$_3$)$_2$—O)$_8$—OSi(CH$_3$)$_2$H.

8. The silicone composition of claim 1, wherein the composition is composed of two components (i) and (ii), component (i) comprising the constituents (A), (B), and (D) and optionally (C), and component (ii) comprising the constituents (A) and optionally (C) or (D), with the proviso that (C) is not present in both components simultaneously but must be present at least in one of components (i) and (ii).

9. An addition-crosslinked silicone elastomer prepared by curing the addition-crosslinking silicone composition of claim 1.

10. A process for the compounding of the self-adhesive addition-crosslinking silicone composition of claim 1, which comprises mixing components (A), (B), (C), (D), and (E) and any other components in any order.

11. A process for curing a self-adhesive addition-crosslinking silicone composition, which comprises heating the addition-crosslinking silicone composition as claimed in at least one of claim 1 a temperature sufficient to initiate crosslinking.

12. A method of joining a self-adhesive addition-crosslinking silicone composition to at least one substrate, which comprises applying the addition-crosslinking silicone composition of claim 1 to a substrate, and heating.

13. A composite material comprising at least one self-adhesive addition-crosslinking silicone composition of claim 1 and at least one substrate.

14. A process for preparing a composite material from the self-adhesive addition-crosslinking silicone composition of claim 1, comprising coating, adhesive bonding, casting, molding, or encapsulating a substrate and heating to a temperature sufficient to cure said silicone composition.

15. The silicone composition of claim 2, wherein at least one adhesion promoter (C) of the formula (III) is selected from the group consisting of

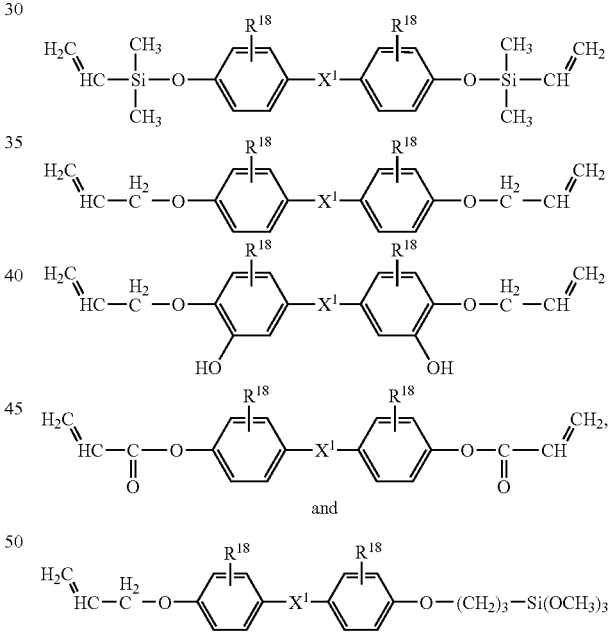

wherein

X$^1$ is —O—, —CH$_2$, —(CH$_3$—)C(—CH$_3$)— or —O—(CH$_3$—)Si(—CH$_3$)—O—, and

R$^{18}$ independently at each occurrence is a hydrogen atom, a vinyl group or an allyl group.

16. The silicone composition of claim 2, further comprising at least one reinforcing filler (F) and at least one inhibitor (G).

17. The silicone composition of claim 2, wherein the organohydropolysiloxane (B) contains from 5 to 40 SiH groups per molecule and the viscosity measured at 25° C. is from 0.002 to 1 Pas.

18. The silicone composition of claim 2, wherein the organohydropolysiloxane (B) contains phenyl groups as radical $R^4$.

19. The silicone composition of claim 2, wherein at least one adhesion promoter (D) is selected from the group consisting of $H(CH_3)_2Si-O-(Si(CH_3)_2-O)_n-OSi(CH_3)_2H$ with n being one of 5, 6, 8, 10 and 12, $H(CH_3)_2Si-O-(Si(Ph)(CH_3)-O)-(Si(CH_3)_2-O)_5-OSi(CH_3)_2H$, and $H(CH_3)_2Si-O-(-Si(Ph)(CH_3)-O)_3-(Si(CH_3)_2-O)_8-OSi(CH_3)_2H$.

* * * * *